(12) United States Patent
Zhang et al.

(10) Patent No.: US 11,231,703 B2
(45) Date of Patent: Jan. 25, 2022

(54) MULTI TASK LEARNING WITH INCOMPLETE LABELS FOR PREDICTIVE MAINTENANCE

(71) Applicant: Hitachi, Ltd., Tokyo (JP)

(72) Inventors: Chi Zhang, San Jose, CA (US); Ahmed Khairy Farahat, Santa Clara, CA (US); Chetan Gupta, San Mateo, CA (US); Karan Aggarwal, Minneapolis, MN (US)

(73) Assignee: HITACHI, LTD., Tokyo (JP)

( * ) Notice: Subject to any disclaimer, the term of this patent is extended or adjusted under 35 U.S.C. 154(b) by 134 days.

(21) Appl. No.: 16/540,810

(22) Filed: Aug. 14, 2019

(65) Prior Publication Data

US 2021/0048809 A1    Feb. 18, 2021

(51) Int. Cl.
  *G05B 23/02*    (2006.01)
  *G06N 3/08*    (2006.01)
(52) U.S. Cl.
  CPC ..... *G05B 23/0283* (2013.01); *G05B 23/0254* (2013.01); *G06N 3/084* (2013.01)
(58) Field of Classification Search
  CPC . G05B 23/0283; G05B 23/0254; G06N 3/084
  See application file for complete search history.

(56) References Cited

U.S. PATENT DOCUMENTS

| | | | | |
|---|---|---|---|---|
| 10,140,980 B2* | 11/2018 | Bengio | .................... | G10L 15/16 |
| 10,403,269 B2* | 9/2019 | Sainath | .................. | G06N 3/084 |
| 10,748,066 B2* | 8/2020 | Ravi | ........................ | G06N 3/04 |
| 10,839,284 B2* | 11/2020 | Hashimoto | .............. | G06N 3/04 |
| 10,885,277 B2* | 1/2021 | Ravi | ....................... | G06N 3/082 |
| 2015/0186792 A1* | 7/2015 | Chidlovskii | ........... | G06Q 50/28 |
| | | | | 706/12 |
| 2016/0139245 A1* | 5/2016 | Forero | ...................... | G01S 5/18 |
| | | | | 367/127 |
| 2017/0028499 A1* | 2/2017 | Yoshida | ............... | B23K 9/0953 |

(Continued)

FOREIGN PATENT DOCUMENTS

| | | |
|---|---|---|
| EP | 3182346 A1 | 6/2017 |
| WO | 2019/022737 A1 | 1/2019 |

OTHER PUBLICATIONS

Mao et al. ,Bearing Fault Diagnosis based on Multi-task Learning, IEEE (Year: 2018).*

(Continued)

*Primary Examiner* — Mohammad K Islam
(74) *Attorney, Agent, or Firm* — Procopio, Cory, Hargreaves & Savitch, LLP

(57) ABSTRACT

Example implementations described herein involve, for data having incomplete labeling to generate a plurality of predictive maintenance models, processing the data through a multi-task learning (MTL) architecture including generic layers and task specific layers for the plurality of predictive maintenance models configured to conduct tasks to determine outcomes for one or more components associated with the data, each task specific layer corresponding to one of the plurality of predictive maintenance models; the generic layers configured to provide, to the task specific layers, associated data to construct each of the plurality of predictive maintenance models; and executing the predictive maintenance models on subsequently recorded data.

12 Claims, 6 Drawing Sheets

(56) References Cited

U.S. PATENT DOCUMENTS

| | | | |
|---|---|---|---|
| 2017/0169143 A1 | 6/2017 | Farahat et al. | |
| 2017/0185068 A1* | 6/2017 | Nishi | G05B 19/4185 |
| 2018/0260712 A1* | 9/2018 | Hatada | B23K 26/21 |
| 2018/0268257 A1* | 9/2018 | Ren | G06T 7/001 |
| 2019/0130659 A1* | 5/2019 | Ide | G07C 5/0808 |
| 2019/0156211 A1* | 5/2019 | Dong | G06N 3/0454 |
| 2020/0175362 A1* | 6/2020 | Zhang | G06N 3/04 |
| 2020/0265276 A1* | 8/2020 | Xu | A61B 6/466 |
| 2021/0064998 A1* | 3/2021 | Cheng | G06F 17/18 |

OTHER PUBLICATIONS

Xu et al. ,A Digital-Twin-Assisted Fault Diagnosis Using Deep Transfer Learning (Year: 2019).*

Si, X-S. et al., "Remaining useful life estimation—a review on the statistical data driven approaches," European journal of operational research, 2011, vol. 213, No. 1, pp. 1-14 (14 pages).

Wu, W. et al. "Prognostics of machine health condition using an improved arima-based prediction method," in Industrial Electronics and Applications, 2007. ICIEA 2007, pp. 1062-1067 (6 pages).

Pham, H. et al. "Estimation and forecasting of machine health condition using arma/garch model," Mechanical Systems and Signal Processing, 2010, vol. 24, No. 2, pp. 546-558 (13 pages).

Si, X-S. et al., "Remaining useful life estimation based on a nonlinear diffusion degradation process," IEEE Transactions on Reliability, Mar. 2012, vol. 61, No. 1, pp. 50-67 (19 pages).

Dong, Ming "A tutorial on nonlinear time-series data mining in engineering asset health and reliability prediction: concepts, models, and algorithms," Mathematical Problems in Engineering, 2010 (23 pages).

Gugulothu, N. et al. "Predicting remaining useful life using time series embeddings based on recurrent neural networks," in 2nd ACM SIGKDD Workshop on Machine Learning for Prognostics and Health Management, 2017 (10 pages).

Guo, L. et al. "A recurrent neural network based health indicator for remaining useful life prediction of bearings," Neurocomputing, 2017, vol. 240, pp. 98-109 (13 pages).

Zhao, R. et al. "Learning to monitor machine health with convolutional bi-directional LSTM networks," Sensors, 2017, vol. 17, No. 2 (18 pages).

Zheng, S. et al. "Long short-term memory network for remaining useful life estimation," in Prognostics and Health Management (ICPHM), 2017 IEEE International Conference, pp. 88-95 (8 pages).

Zhang, C. et al. "Equipment health indicator learning using deep reinforcement learning," in ECML-PKDD, 2018 (16 pages).

Caruana, R. "Multitask learning," Machine learning, 1997, vol. 28, No. 1, pp. 41-75 (35 pages).

Yoon, A. et al. "Semi-supervised learning with deep generative models for asset failure prediction," KDD'17, Workshop on Machine Learning for Prognostics and Health Management, Aug. 13-17, 2017, Halifax, Nova Scotia—Canada (9 pages).

* cited by examiner

MULTI TASK LEARNING WITH INCOMPLETE LABELS FOR PREDICTIVE MAINTENANCE

BACKGROUND

Field

The present disclosure is generally directed to predictive maintenance systems, and more specifically, to execution of multi task learning with incomplete labels for predictive maintenance.

Related Art

Predictive Maintenance (PdM) is a widely-adopted maintenance practice which is based on continually monitoring the condition of the equipment with the goal of determining the right maintenance actions to be taken at the right times. With the advance of Internet of Things (IoT) and its applications to industrial environments, data analytics algorithms can be applied to the data coming from equipment in real time in order to provide actionable insights about equipment health and performance and predict impending failures and downtime. The use of data-driven technologies for predictive maintenance increases equipment availability, reduces the cost of maintenance, and improve the safety of equipment operators.

Predictive maintenance involves the solution of several related problems which include (but not limited to), Remaining useful life (RUL) estimation as a long-term task which estimates how much time is left in the useful life of the equipment, Failure prediction (FP) which estimates the probability that a failure is going to happen within a typically short time horizon, Fault detection (FD) which detects faults as soon as they happen, and Performance degradation detection (PDD) which detects slow degradation in the performance of the equipment.

These predictive maintenance problems are typically solved independently using separate models, which is problematic for real-world applications. When these models are applied in practice to the same component simultaneously, this might lead to inconsistent results. For example, failure prediction model can predict that a failure will happen in five days with 80% probability, while RUL model may predict that there is 10 days until the failure concurrently. Taking a closer look of these models, it is clear that they are usually trained on the same input data, share similar features, and give highly correlated outputs. For example, RUL estimation and failure prediction (FP) are about predicting when the failure event is going to happen, and fault detection is about learning abnormal events which are usually strong indicators of failures in a near future. Performance degradation detection model evaluates general health conditions by giving a degradation curve, which indicates fault or failure when significant degradations are observed.

SUMMARY

In order to exploit the relationship between these different time horizons and give consistent results, example implementations described herein involve using multi-task learning (MTL) to exploit the implicit relationship between tasks to learn the underlying failure/fault distribution and system dynamics. However, related art multi-task learning algorithms require the availability of all the labels associated with each task for every input signal (e.g., time to failure, likelihood of failure, performance indicator value, etc.). Such requirements can be infeasible in practical systems as typically one label is available for a certain predictive maintenance task at a given point of time and other labels might not be available or even applicable to obtain (e.g., having time to failure labels only so that RUL and FP tasks can be performed but performance degradation detection is impossible due to the lack of KPI labels). Such incomplete label information cannot be easily handled by related art MTL approaches.

Example implementations described herein involve a novel learning methodology for MTL to solve a large variety of PdM tasks with incomplete labels. In addition, the developed approach is capable of modeling multiple type of subjects (e.g., various failure modes, faults, or degradation), which differentiate the example implementations from related art approaches of unified methods that can only deal with a single failure mode.

Example implementations utilize MTL with a novel learning methodology for handling multiple predictive maintenance tasks with incomplete label information. This approach allows different predictive maintenance tasks such as failure prediction, remaining useful life estimation, fault detection and performance degradation detection to be learned simultaneously within a single model to ensure consistent predictions while being capable of learning with incomplete label information.

In particular, the example implementations described herein involve the following aspects.

Aspects of the present disclosure include utilizing MTL as a unified approach for a large range of predictive maintenance tasks such as failure prediction, remaining useful life estimation, fault detection and performance degradation detection, while providing consistent results.

Aspects of the present disclosure involve a novel learning methodology to handle incomplete label information which is a common problem in industrial applications, without losing the capability of solving multiple tasks.

Aspects of the present disclosure involve utilizing the relationship between the tasks working at different time-horizons, so that the example implementations builds only one model working for multiple failure modes and fault types simultaneously.

Aspects of the present disclosure involve a novel constraint loss to use the non-failure (censored) data in RUL estimation, which is an unsolved problem in previous related art studies. Without any need for a pre-prediction step of a dedicated unsupervised learning procedure, this new method in accordance with the example implementations described herein provides a much more practical utility and an ability to be deployed.

Aspects of the present disclosure involve a method, which can involve, for data having incomplete labeling to generate a plurality of predictive maintenance models, processing the data through a multi-task learning (MTL) architecture including generic layers and task specific layers for a plurality of predictive maintenance models configured to conduct tasks to determine outcomes for one or more components associated with the data, each task specific layer corresponding to one of the plurality of predictive maintenance models; the generic layers configured to provide, to the task specific layers, associated data to construct each of the plurality of predictive maintenance models; and executing the predictive maintenance models on subsequently recorded data from the one or more components.

Aspects of the present disclosure involve a non-transitory computer readable medium, storing instructions for executing a process, the instructions involving, for data having incomplete labeling to generate a plurality of predictive maintenance models, processing the data through a multi-task learning (MTL) architecture including generic layers and task specific layers for the plurality of predictive maintenance models configured to conduct tasks to determine outcomes for one or more components associated with the data, each task specific layer corresponding to one of the plurality of predictive maintenance models; the generic layers configured to provide, to the task specific layers, associated data to construct each of the plurality of predictive maintenance models; and executing the predictive maintenance models on subsequently recorded data from the one or more components.

Aspects of the present disclosure involve a system involving, for data having incomplete labeling to generate a plurality of predictive maintenance models, means for processing the data through a multi-task learning (MTL) architecture including generic layers and task specific layers for the plurality of predictive maintenance models configured to conduct tasks to determine outcomes for one or more components associated with the data, each task specific layer corresponding to one of the plurality of predictive maintenance models; the generic layers configured to provide, to the task specific layers, associated data to construct each of the plurality of predictive maintenance models; and means for executing the predictive maintenance models on subsequently recorded data from the one or more components.

Aspects of the present disclosure involve a system, involving one or more components; and an apparatus configured to receive data from the one or more components, the apparatus involving a processor, configured to, for the data having incomplete labeling to generate a plurality of predictive maintenance models, process the data through a multi-task learning (MTL) architecture including generic layers and task specific layers for the plurality of predictive maintenance models configured to conduct tasks to determine outcomes for the one or more components associated with the data, each task specific layer corresponding to one of the plurality of predictive maintenance models; the generic layers configured to provide, to the task specific layers, associated data to construct each of the plurality of predictive maintenance models; and execute the predictive maintenance models on subsequently recorded data from the one or more components.

DETAILED DESCRIPTION

Figure 1:
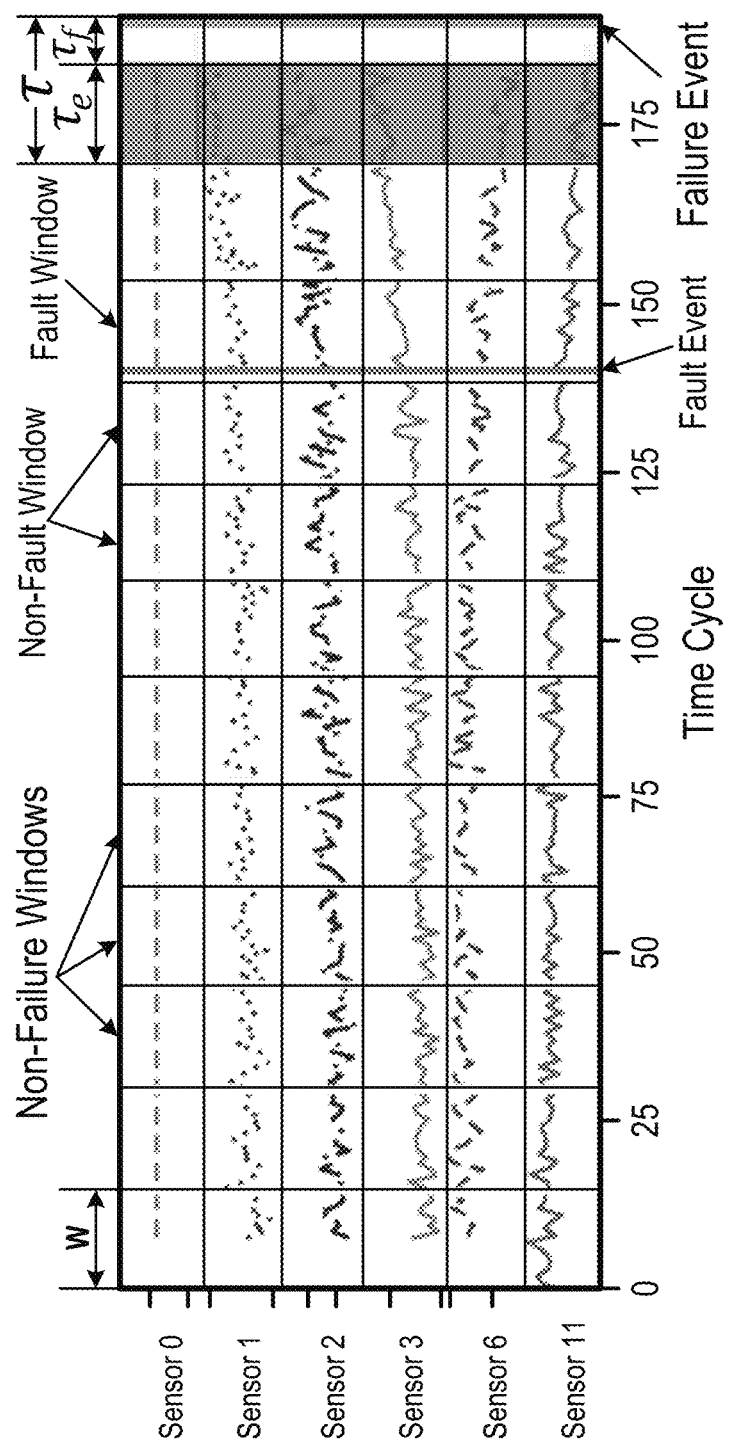
FIG. 1 illustrates an example of equipment time-series into tumbling windows, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Predictive maintenance continually monitors the condition of the equipment to determine the right maintenance actions to be taken at the right times. Equipment uptime is getting increasingly crucial across different industries which seek new ways of increasing equipment availability. Using predictive maintenance, one can increase equipment availability, improve the safety of operators, and reduce the environmental incidents. Therefore, the algorithmic prediction of component failures early enough is necessary for proper maintenance scheduling. This problem is posed in four ways to capture the degradation process: (i) estimate if the failure of the component will happen within a given time horizon (failure prediction), (ii) estimate length of time from the current time when component performance will be below operational requirements (RUL estimation), (iii) detect if faults happen in real-time (fault detection), (iv) detect performance detection in real-time (performance degradation detection), and so on.

Remaining useful life estimation, failure prediction, fault detection, and performance degradation detection are classical problems of critical importance to several stakeholders who are involved in maintaining and operating the equipment. A number of related art techniques have been used for solving these problems, mostly utilizing the temporal models using time-series analysis, explicit degradation modeling, hidden Markov models, and deep learning methods.

The related art approaches are optimized using separate models with different objective functions. However, the use of separate objectives is a sub-optimal approach to the maintenance task for the following reasons. Firstly, the PdM tasks can be biased due to problem formulation. For example, RUL estimations minimize overall prediction errors, and near failure errors are usually small, so such approaches focus on correcting the errors when the device is far from failure. However, this can be a misplaced focus since a prediction that is off by ten days near failure time is much worse than a prediction that is off by 40 days or 100 days from failure, in particular since the focus of RUL methods is the latter case where it encounters much bigger error.

Second, if these models are applied in practice on the same component simultaneously, this might lead to inconsistent predictions, posing a dilemma for the decision maker. For example, the failure prediction model can predict that failure will happen in five days with 80% probability, while the RUL model might predict that there are ten days until the failure.

Third, RUL estimation, FP, FD and performance degradation (PD) are related tasks. That is, RUL task is a long-term prediction task while FP is a short-term predication task, and FD and PD are real-time estimation tasks. By putting them in one framework, the example implementations can exploit these time horizons, especially with the two previously mentioned issues.

Some of these tasks can be unified under the same framework. For instance, one way around to unify RUL estimation with FP is using RUL predictions for the failure prediction task since failure prediction labels can be obtained by applying a threshold on the predicted RUL value. This assumption usually gives a suboptimal performance for the failure prediction task. The other naive approaches involve using either failure prediction or RUL. Such approaches do not work since there is often a need for both short-term and long-term prediction at the same time.

In contrast to the related art, example implementations utilize a unified approach with an MTL architecture to learn shared representation and optimizes towards multi tasks simultaneously, that does not impose any priors on data distribution, which differentiates the example implementations from the Deep Weibull approach that explicitly encodes the failure dynamics. In addition, transformations of output are not necessary to link an explicit distribution to outputs (i.e., predictions). The approach in example implementations handles non-failed examples (i.e., censored) by introducing a novel loss function, which is utilized for successful learning in practice. Moreover, the example implementations are not restricted in solving two tasks (i.e., FP and RUL estimation) only, but aims to solve multi-tasks for the same type of equipment as long as the same set of observations are available. Finally, example implementations are capable of dealing with more than one failure or fault mode in a single model, which is infeasible due to the explicit distribution assumption in the related art. These are key differences between the example implementations described herein and the related art approaches which involve a Weibull distribution based deep learning approach in the related art.

At an abstract level, the example implementations involve the following components, Data preparation, Multi-task learning architecture building, Objective function definition, Learning with incomplete label information, and Model inference.

MTL for PdM involves incorporating information from time sequence sensor data, event data, failure data, fault data, Key Performance Indicator (KPI) data, and metadata. To create an accurate unified approach the following steps should be executed in the sequence presented.

Data Preparation

The approach of example implementations receives the following formats of input data.

Sensor data: These are streaming and historical time series data collected from different sensors. Each time series represent the readings of the sensor value each k time cycles (e.g., minutes), where k depends on the frequency by which data can be retrieved from this sensor. The sampling rate k can have different values for different sensors. Each sensor reading is associated with a timestamp that specifies the date and time of the reading. The data can be collected from the sensor in batches, where each batch of data represents the sensor readings for a few days. There might be gaps between batches. For instance, the data for a day can be received at the monitoring facility at the end of the day. The data collection frequency can also differ from a sensor to another.

Event data: These are discrete events that are relevant to the equipment domain. It describes events that happened in the environment of the equipment. This includes, but is not limited to, events that are parts of the equipment operation (e.g., start of operation), maintenance and check-up actions that were conducted on the equipment (e.g., part replacement, overhaul), external actions in the environment of the equipment (e.g., blackout, heat wave), and fault events that are logged by domain experts. Each event is associated with a time-stamp that specifies the date and sometimes the time of the event.

Failure data: These are discrete failure events that happened in the past. Each failure event is associated with a time-stamp that specifies the date and sometimes the time of the failure. It might also have associated attributes like the type of the failure, the particular component that failed, and other attributes related to the cause of the failure and the repair actions.

Fault data: Similar to failure data, these are discrete fault events that happened in the past. Each fault event is associated with a time-stamp that specifies the date and sometimes the time of the fault. It might also have associated attributes like the type of the fault, the particular component that has fault, and other attributes related to the cause of the fault and the corrective actions.

KPI data: KPI data can be given in different ways: 1) time sequences associated with sensor data, or 2) formulas to calculate KPIs from sensor data.

Metadata: These are data that describe extra information about the characteristic of the equipment and environment in which the equipment is installed. This includes, but not limited to, the specifications of the equipment (e.g., model, make, capacity), operation conditions (e.g., operation hours), environment conditions (e.g., location, temperature, humidity), the installation information (e.g., date), and maintenance records (e.g., date, conditions, notes). All these data can appear in structured, semi-structured or unstructured formats.

Input data is a set of time sequences generated from sensor measurements, sequence of operations and the events generated during the operations of the component/system which might be relevant to the problem. Several steps are necessary to perform before the data is used as an input to the proposed MTL approach. Example implementations leverage the data processing as previous contributions to the field of failure prediction, RUL estimation, FD, etc. based on sensors. Sensor data are typically collected from different data streams (e.g., equipment sensors and weather data). Each time series might have a different sampling rate and the data might arrive in batches of different sizes. The objective of this step is to consolidate data from different sources and obtain data in a tabular format whose columns represent the sensors and each row represents the sensor readings at a unique timestamp, as shown in FIG. 1. These rows are referred to as data records. Example implementations also remove outliers and prepare data in the format consumable by MTL architecture. The following steps as illustrated in FIG. 1 are conducted for data preparation:

Divide each equipment time-series into tumbling windows of size w, i.e., each window contains observations $x_t : x_{t+w-1}$ as shown in FIG. 1. Assuming that the device p fails at time $t_{p,f}$, the following terminologies are utilized:

Filter window: Since prediction just before the failure time $t_f$ does not give enough warning in the realistic settings, we introduce the concept of filter window of size $\tau_f$.

Evidence window: Evidence window (size $\tau_e = \tau - \tau_f$) is the time during which the system undergoes (sudden) degradation and the failure probability is high.

Size of $\tau_e$ is domain dependent and a critical parameter in providing timely warning. For example, too small $\tau_e$ does not provide much bandwidth for maintenance purpose depending on the domain while being highly predictive, while using too large value would make faulty assumptions on the degradation process with low predictive performance. In practice, for a domain like heavy machinery, small evidence window is not very useful, while for a domain like hard disk failures a relatively smaller value would suffice. For ease of explanation, it is assumed that the unit of time is the window size w unless specified otherwise.

Create labels for each created sequence. For example, in failure prediction the windows falling in the evidence window are assigned with failure labels since any window falling in the evidence window will experience a failure in the prediction horizon τ. By formulating the failure prediction problem this way, a timely warning can be provided which is critical in practice for scheduling maintenance and operational logistics. All the other windows are labeled as non-failure windows.

Similarly, assume that fault labels are also provided and formulate fault detection as a classification problem. For windows that have faults occurrence, they are labeled with fault and otherwise non-fault if there are no fault occurrences.

Information about the performance of the equipment is usually obtained in the form of formulas in the metadata as well as high level description from the domain experts (e.g., the equipment should cool down faster when the fan is turned on at the maximum speed).

Generally, using these relations derived from the metadata and the domain knowledge, a KPI is defined for each component as well as the overall performance of the equipment. In this invention assume the KPIs are already calculated (i.e., given).

Class Balancing: As some datasets are highly skewed with very few devices experiencing a failure and/or a fault. In order to tackle this issue, random sampling methods are used to balance the number of failed devices to non-failed devices, such as up-sampling and down-sampling. However, one major problem that still stands is the fact that only a minuscule number of windows have the failure label (evidence windows). Thus, the class weighting is used as a hyper-parameter for the multi-task learning approach to tackle this problem.

MTL Architecture Building

The idea of multi-task learning is that if two or more tasks at hand are related to each other, a common useful feature space can be created by learning them jointly. For instance, when solving the problem of failure prediction and RUL jointly, RUL is the expectation of the probability density of time-to-failure random variable over the time domain, while failure prediction is the cumulative distribution within a short horizon of the time-to-failure random variable.

Figure 2:
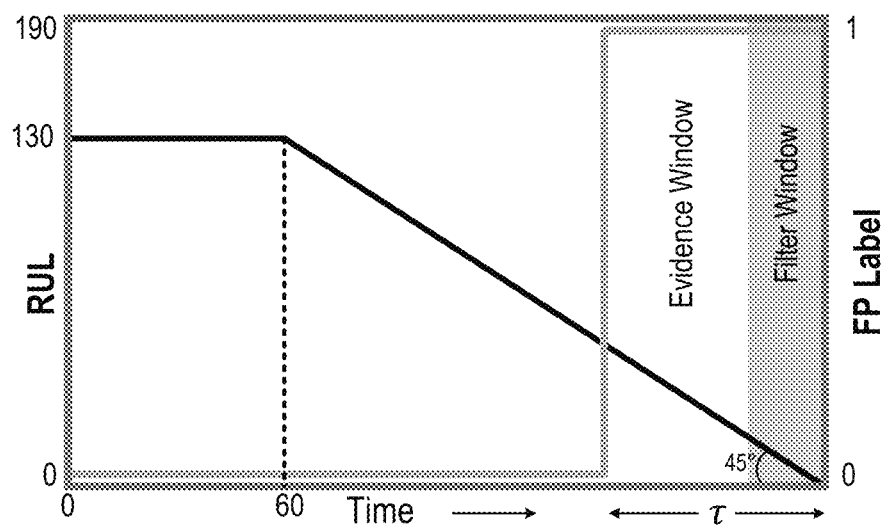
FIG. 2 illustrates an example RUL relationship over time for failure prediction, in accordance with an example implementation.

The graphical representation of the relationship is shown in FIG. 2.

Learning the RUL and failure prediction jointly helps the model learn the underlying distribution conditional on the input observations "implicitly" without making an "explicit" assumption. Example implementations utilize a shared Recurrent Neural Network as an embodiment of MTL, with task-specific layers emulating from the last generic layer.

Figure 3:
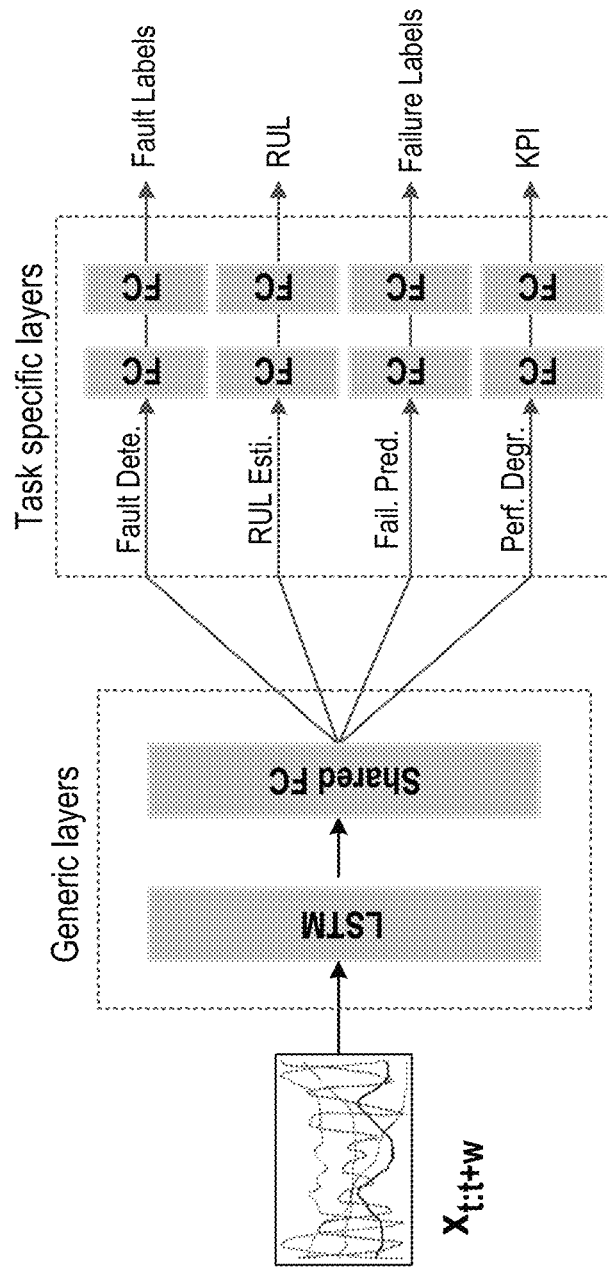
FIG. 3 illustrates an example architecture schematic, in accordance with an example implementation.

FIG. 3 illustrates an example architecture schematic, in accordance with an example implementation. As illustrated in FIG. 3, sensor data as provided from the data preparation of FIG. 1 is provided to machine learning classifiers that involve generic layers and task specific layers. The data is first provided to generic layers, which involve long-short term memory (LSTM) layers, which can are then connected to shared fully connected (FC) layers. The generic layers are utilized to generate shell layers for the predictive maintenance models to be utilized along with associated data corresponding to each of the predictive maintenance models to be generated. For example, if the predictive maintenance model is directed to fault detection, then the data associated with fault detection from the data preparation (e.g., fault events from the sensor data), are provided as the labels for the task specific layers, The shell layers are then divided into task specific layers to form each of the predictive maintenance models. As shown in the task specific layers, each layer involves specific tasks for specific layers to generate predictive maintenance models, such as fault detection, RUL estimation, failure prediction and performance degradation. Each of the task specific layers captures a special characteristic of each task for the predictive maintenance model. Although the architecture utilized is LTSM with FC layers, other machine learning networks can also be utilized to facilitate the desired implementation.

As illustrated in FIG. 3, from the architecture, objective functions are generated for each of the predictive maintenance models. The network example of FIG. 3 involves four different outputs (Fault Labels for fault detection, RUL, failure labels for failure prediction, relevant KPIs for performance degradation), such that one label is provided for one task.

Objective Function Definition

PdM is first categorized in tasks into classification and regression tasks, and then describe the loss functions used to solve the various tasks in a single model:

a) Classification Tasks

Failure Prediction: as failure prediction is a binary classification problem (e.g., either 0 for failure or 1 for non-failure), the two-class classification task (failure vs. non-failure) has a cross-entropy loss:

$$L_c = \Sigma_{p=1}^N \Sigma_{t=1}^{c_p} \{ \mathbb{1}(f^{p,t}=0) \log p(f^{p,t}=0|x,\theta) + \alpha_c \mathbb{1}(f^{p,t}=1) \log p(f^{p,t}=1|x,\theta) \} \quad (1)$$

where, $f^{p,t}=1$ if device p is in a failure state at time t, θ are the deep network parameters, and $\alpha_c$ is the weighting parameter that can be tuned to give higher weighting to the failure class during training to account for the imbalance in the data. $p(f^{p,t}=0|x,\theta)$ is the probability of non-failure state calculated using soft-max from the failure prediction layer. Let the input to the soft-max layer be $\gamma_\theta(x)$, where $\gamma_\theta(\cdot)$ is the neural network transformations of the input x. Example implementations can determine the probability of failure to be:

$$p(f=1|x,\theta) = \frac{\exp(W_1^T \gamma_\theta(x))}{\exp(W_0^T \gamma_\theta(x)) + \exp(W_1^T \gamma_\theta(x))} \quad (2)$$

with $W_0$, $W_1$ being the weights in the soft-max layer corresponding to be non-failure and failure class, respectively.

Fault Detection: Given the fault labels, it inherits the same idea as failure prediction using fault labels to derive a loss function $\mathcal{L}_f$, $$L_f = \Sigma_{p=1}^N \Sigma_{t=1}^{f_p} \{ \mathbb{1}(g^{p,t}=0) \log p(g^{p,t}=0|x,\theta) + \alpha_f \mathbb{1}(g^{p,t}=1) \log p(g^{p,t}=1|x,\theta) \} \quad (3)$$

$g^{p,t}=1$ if device p is in a failure state at time t, θ are the deep network parameters, and $\alpha_f$ is the weighting parameter that can be tuned to give higher weighting to the fault class during training to account for the imbalance in the data. $p(g^{p,t}=0|x,\theta)$ is the probability of non-fault state calculated using soft-max from the fault prediction layer.

b) Regression

RUL Estimation: RUL estimation is a regression problem, wherein the loss function of RUL for a device p that failed can be formulated as a square error loss:

$$L_{r,p}^{f} = \Sigma_{t=1}^{c_p}(\overline{RUL}_{MT}^{p,t} - t_g^{p,t})^2 \quad (4)$$

where is $t_g$ is the ground truth value of time-to-failure (RUL) for failed devices, p denotes the device and t is time, while $c_p$ is the time until which the sensor data is observed (censoring time) for device p. $\overline{RUL}_{MT}^{p,t}$ is the prediction results given by our MTL model. Denote the RUL task loss per device so as not to abuse the notation for the failed and non-failed devices. Treat the failed and non-failed devices separately since there is no ground truth RUL information about the non-failed devices. Accordingly, the loss function can be defined in the prediction fault which is actually the distance between the prediction and the ground truth values.

Non-failed device (censored) data: The multi-task formulation in Eq. 4 assumes that the ground truth labels for both the tasks are known. However, that is rarely the case in the prognostics area. For example, if there is no failure and thereby no RUL, that does not necessarily indicate that the RUL is missing; it could be that the system components are continuously running and have not failed yet and it is not known when it will fail. In such cases, related art techniques for RUL have difficulty in predicting RUL because there is no label to indicate failure.

Usually, the number of non-failed devices is much higher compared to the failed devices. In practical situations, the numbers can be anywhere between <1% to 5% depending on the device's domain. In such a scenario, no ground truth information about the RUL labels is known for the overwhelming majority of the data. The ability of survival analysis to take into account the censored data is what makes it an attractive option for prognostics. Most of the related art implementations discard the non-failed device or used a pre-trained network with autoencoder architectures to utilize the non-failed data for RUL prediction. In order to utilize the non-failure data, example implementations ensure that the predicted RUL values for the non-failure data is greater than the censoring time $c_p$ of the device. The reason for this constraint is straightforward: the device did not experience a failure until the end of observations at $c_p$, hence, it's failure time $t_{p,f}$ should be greater than $c_p$. In order to enforce this constraint, the following objective is used for the non-failed devices:

$$\mathcal{L}_{r,p}^{nf} = \mathbb{1}(t_{p,f} > c_p) \sum_{t=1}^{c_p} \max(c_P - \overline{RUL}_{MT}^{p,t}, 0) \quad (5)$$

where, the $\mathbb{1}(t_{p,f} \leq c_p)$ is the indicator function set to 1 if the device p fails within the observation period $c_p$ of the device. Hence, example implementations can utilize the non-failure data to train the network on all instances for the failure prediction task, while ensuring that the RUL predicted is greater than the censoring time, $c_p$. For the failed device data we learn on both the tasks with conventional objectives. Loss function for the RUL task can be written as:

$$\mathcal{L}_r = \sum_{p=1}^{N} \{\mathcal{L}_{r,p}^{f} + \mathcal{L}_{r,p}^{nf}\} = \sum_{p=1}^{N} \{\underbrace{\mathbb{1}(t_{p,f} \leq c_p) \sum_{t=1}^{c_p} (\overline{RUL}_{MT}^{p,t} - t_g^{p,t})^2}_{\text{Device failure observed}} + \quad (6)$$

$$\underbrace{\mathbb{1}(t_{p,f} > c_p) \sum_{t=1}^{c_p} \max(c_P - \overline{RUL}_{MT}^{p,t}, 0)\}}_{\text{Device failure not observed}}$$

Performance Degradation: given KPIs associated with sensor data, the loss function is:

$$L_d = \Sigma_{p=1}^{N} \Sigma_{t=1}^{c_p} (\widehat{KPI}_{MT}^{p,t} - KPI_g^{p,t})^2 \quad (7)$$

where $\widehat{KPI}_{MT}^{p,t}$ is the predicted KPI for device p at time t and $KPI_{MT}^{p,t}$ is the ground truth.

Combined Loss: Using the loss functions in the Eq 1, 3, 6, and 7, train the network jointly with a combined loss $\mathcal{J}(\theta)$:

$$\mathcal{J}(\theta) = \alpha_1 \mathbb{1}_c \mathcal{L}_c + \alpha_2 \mathbb{1}_f \mathcal{L}_f + \alpha_3 \mathcal{L}_r + \alpha_4 \mathbb{1}_p \mathcal{L}_p + \alpha_5 \mathbb{1}_d \mathcal{L}_d + \alpha_6 \|\theta\|_2 \quad (8)$$

with $\alpha_1$, $\alpha_2$, $\alpha_3$, $\alpha_4$, $\alpha_5$ being the hyper-parameters for adjusting the relative weights of the FP, RUL, and FD tasks respectively, and $\alpha_6$ is the l2 regularization strength for the model parameters. $\mathbb{1}_c$, $\mathbb{1}_f$, $\mathbb{1}_p$, $\mathbb{1}_d$ are indicator functions. For example, $$\mathbb{1}_c = \begin{cases} 0, & \text{if failure label is missing} \\ 1, & \text{otherwise} \end{cases} \quad (9)$$

indicates whether failure label for a given training data point is missing. Hence, this combined loss function not only tries to ensure consistent predictions of various PdM tasks but also applicable to handle incomplete labels.

Learning with Incomplete Label Information

In PdM settings, labels for various tasks can be incomplete. For example, for some machines only failure labels are available and fault labels are not properly logged. On the other hand, some equipment may only contain fault events, and never experience any failures. In such cases, part of Eq. 8 would be zero as indicated by indicator functions such as Eq. 9. Then, the gradient will not be back-propagated to the task-specific layers where the corresponding indicator function is zero (i.e., missing task labels), so that the weights in these layers will not be updated. Note that the generic layers are always updated, as shown in FIG. 4.

Figure 4:
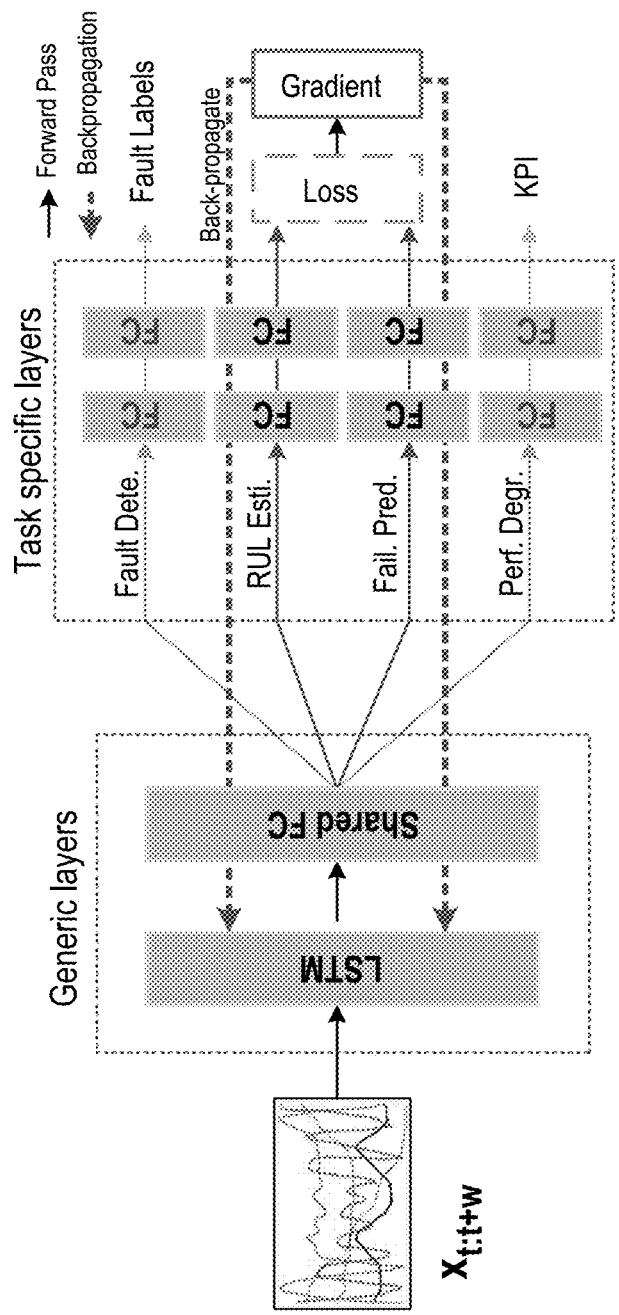
FIG. 4 illustrates an example of updating generic layers and task-specific layers through a back propagation process, in accordance with an example implementation.

FIG. 4 illustrates an example of updating generic layers through a back propagation process, in accordance with an example implementation. Suppose that there are missing labels as indicated by the combined function. The obtained loss is utilized to calculate a gradient and then the gradient will be back propagated to the generic layers. With the gradient, example implementations can update the parameters utilized in the generic layers through back propagation. In the forward pass, given the data, the data is processed through LSTM or through the shared layers.

Accordingly, example implementations construct generic and task specific layers for the predictive maintenance models, through using the MTL architecture as described. Accordingly, even if unlabeled data is received, a gradient can be calculated based on previously processed data and then the data can be subsequently labeled based on the calculation as illustrated in Eq. 8 and Eq. 9. In this manner, even if the data is insufficiently labeled, the data can be back propagated and utilized to generate the predictive maintenance models, which is an improvement over related art machine learning techniques that cannot utilize machine learning without the appropriate labeling.

Further, each of the predictive maintenance models are trained together based on the combined loss function as illustrated in Eq. 8 and 9, which trains the predictive maintenance models to be correlated with each other, resulting in predictive maintenance models that are related to each other even if there was no labeled data to generate some of the models. Such example implementations are an improvement over related art implementations that generate models that do not correlate with each other, and in some circumstances, could not generate any models at all due to the lack of labeled data. Example implementations thereby solve the above problems to correlate the models together and create labels as needed through the back propagation process.

Model Inference (Application)

Given a streaming data, preparation steps are followed to prepare testing data. It is worth mentioning that in application phase none of the labels are necessary. In fact, given a test example, the MTL model will produce the labels for all the tasks.

Thus, example implementations described herein solve a large variety of PdM tasks with incomplete labels with one model. Example implementations utilize multi-task learning with a novel learning methodology for handling multiple predictive maintenance tasks with incomplete label information. This approach allows different predictive maintenance tasks such as failure prediction, remaining useful life estimation, fault detection and performance degradation detection to be learned simultaneously within a single model to ensure consistent predictions while being capable of learning with incomplete label information.

Example implementations utilize MTL as a unified approach for a large range of predictive maintenance tasks such as failure prediction, remaining useful life estimation, fault detection and performance degradation detection, providing consistent results. Example implementations involve a novel learning methodology to handle incomplete label information which is a common problem in industrial applications, without losing the capability of solving multiple tasks. Example implementations implicitly exploit the relationship between the tasks working at different time-horizons, so that it builds only one model working for multiple failure modes and fault types simultaneously. Example implementations also involve a novel constraint loss to use the non-failure (censored) data in RUL estimation that is one of the most challenging tasks in PdM, which is an unsolved problem in previous studies. Without any need for a pre-prediction step of a dedicated unsupervised learning procedure, the example implementations provide a much more practical utility and an ability to be deployed.

Figure 5:
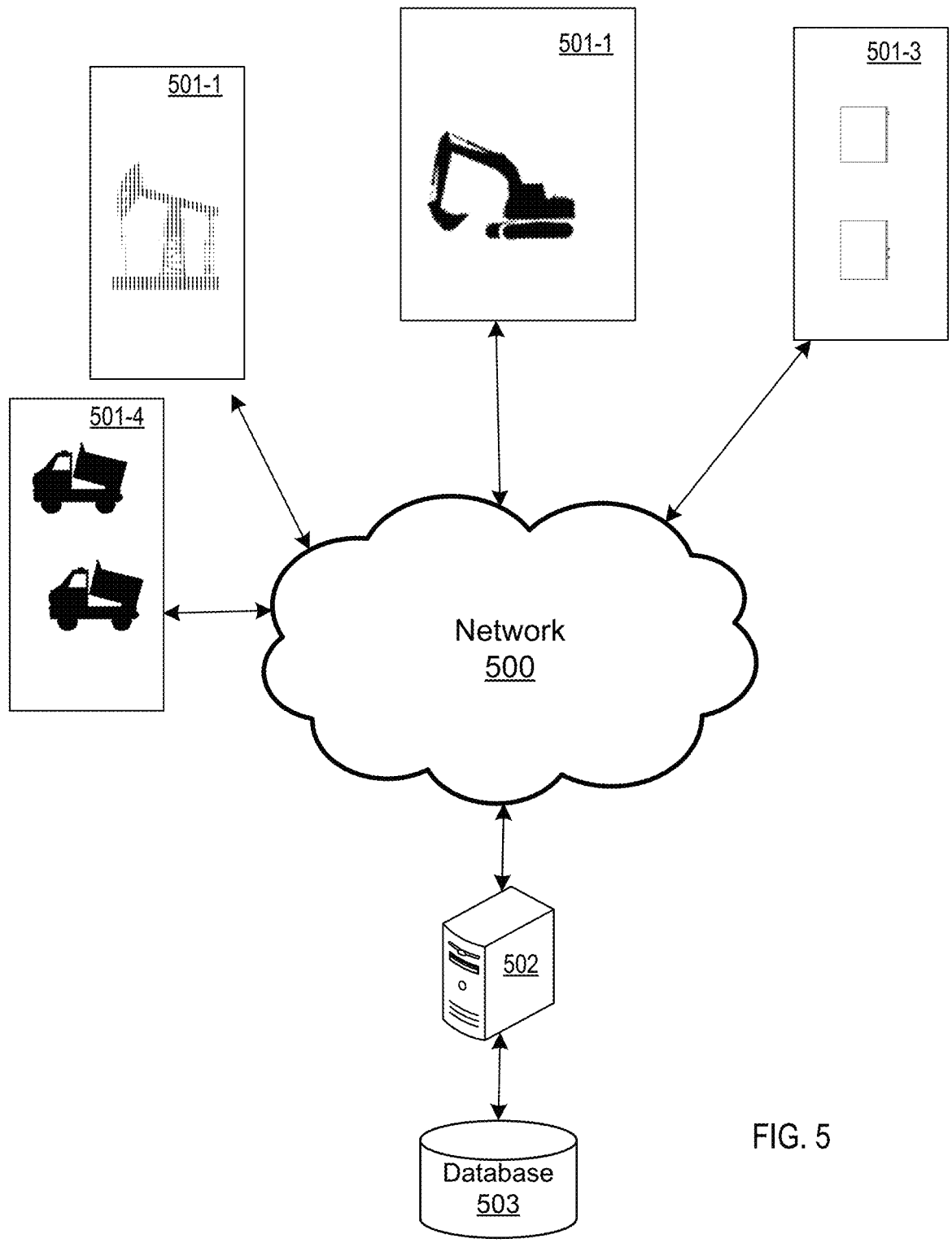
FIG. 5 illustrates a system involving a plurality of components and a management apparatus, in accordance with an example implementation.

FIG. 5 illustrates a system involving a plurality of components and a management apparatus, in accordance with an example implementation. One or more components or component systems 501-1, 501-2, 501-3, and 501-4 are communicatively coupled to a network 500 which is connected to a management apparatus 502. The management apparatus 502 manages a database 503, which contains historical data collected from the apparatuses and apparatus systems in the network 500. In alternate example implementations, the data from the apparatuses and apparatus systems 501-1, 501-2, 501-3, and 501-4 can be stored to a central repository or central database such as proprietary databases that data from equipment or equipment systems such as enterprise resource planning systems, and the management apparatus 502 can access or retrieve the data from the central repository or central database. Such components can include stationary components or equipment with sensor systems such as coolers, water tanks, air compressors, electrical lines, as well as mobile components or equipment such as moving robots, robotic arms, as well as any other component that are integrated into the industrial networks or can be part of an industrial network. The sensor data provided by the one or more components can involve data while the components were operating under the normal condition, and the sensor data when the components underwent a fault. For integration into training a machine learning classifier and/or regressor for generating predictive maintenance models in accordance with the example implementations described herein, the sensor data may also be labeled to indicate if the sensor data incorporated from the component is when the component is operating in a normal condition or undergoing some sort of fault. However, when there is insufficient labeling for generating the predictive maintenance models (e.g., does not meet the requirements set by the machine learning classifier or regressor), the management apparatus 502 generates the predictive maintenance models and provides labeling through the example implementations described in FIGS. 1-4.

Figure 6:
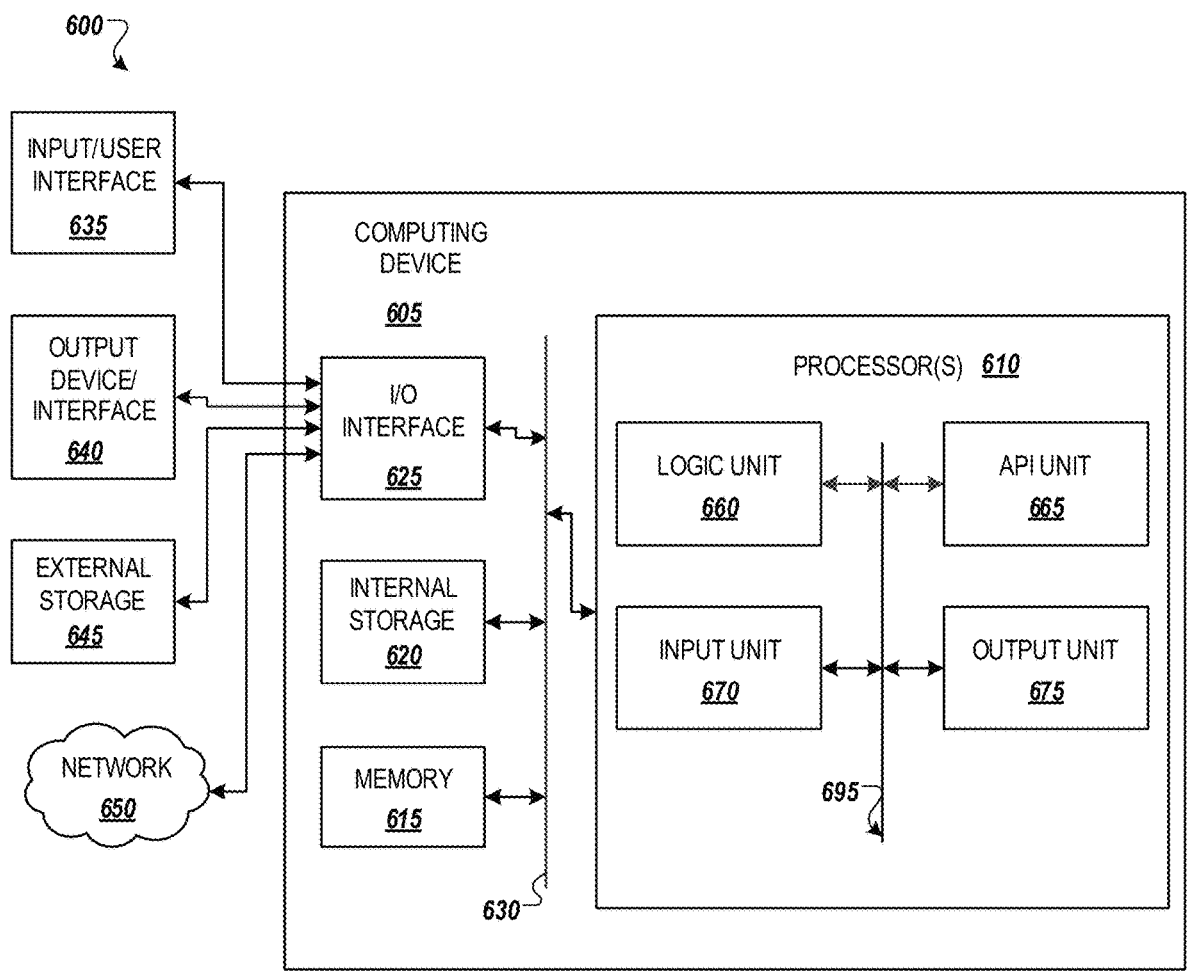
FIG. 6 illustrates an example computing environment with an example computer device suitable for use in some example implementations.

FIG. 6 illustrates an example computing environment with an example computer device suitable for use in some example implementations, such as a management apparatus 502 as illustrated in FIG. 5. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Processor(s) 610 are configured to, for the data having incomplete labeling to generate a plurality of predictive maintenance models: process the data through a multi-task learning (MTL) architecture involving generic layers and task specific layers for the plurality of predictive maintenance models configured to conduct tasks to determine outcomes for the one or more components associated with the data, each task specific layer corresponding to one of the plurality of predictive maintenance models; the generic layers configured to provide, to the task specific layers, associated data to construct each of the plurality of predictive maintenance models; and execute the predictive maintenance models on subsequently recorded data from the one or more components as illustrated in FIGS. 3 and 4.

Processor(s) 610 are configured to execute a back propagation process on the predictive maintenance models to train the predictive maintenance models together as described in Eq. 8 and 9 and as illustrated in FIG. 4.

Depending on the desired implementation, the associated data is output from execution of the generic layers as illustrated in FIG. 4.

As described herein, in example implementations the plurality of predictive maintenance models can involve two or more of: remaining useful life (RUL) (as described in Eq. 4-6), failure prediction (FP) (as described in Eq. 1-2), fault detection (FD) (as described in Eq. 3), and performance degradation (PD) (as described in Eq. 7).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for multi task learning with incomplete labels for predictive maintenance, the method comprising:
   for the data having incomplete labeling to generate a plurality of predictive maintenance models:
   processing the data through the multi-task learning (MTL) architecture comprising a neural network with generic layers and task specific layers for the plurality of predictive maintenance models configured to conduct tasks to determine outcomes for one or more components associated with the data, each task specific layer corresponding to one of the plurality of predictive maintenance models; wherein the generic layers are configured to provide, to the task specific layers, associated data to construct each of the plurality of predictive maintenance models; and executing the predictive maintenance models on subsequently recorded data; wherein the generic layers comprises long-short term memory (LSTM) layers connected to shared fully connected (FC) layers.

2. The method of claim 1, executing a back propagation process on the predictive maintenance models to train the predictive maintenance models together.

3. The method of claim 1, wherein the associated data is output from execution of the generic layers.

4. The method of claim 1, wherein the plurality of predictive maintenance models comprise two or more of: remaining useful life (RUL), failure prediction (FP), fault detection (FD), performance degradation (PD).

5. A non-transitory computer readable medium, storing instructions for executing a process for multi task learning with incomplete labels for predictive maintenance, the instructions comprising:
   for the data having incomplete labeling to generate a plurality of predictive maintenance models:
   processing the data through a the multi-task learning (MTL) architecture comprising a neural network with generic layers and task specific layers for the plurality of predictive maintenance models configured to conduct tasks to determine outcomes for one or more components associated with the data, each task specific layer corresponding to one of the plurality of predictive maintenance models; wherein the generic layers are configured to provide, to the task specific layers, associated data to construct each of the plurality of predictive maintenance models; and executing the predictive maintenance models on subsequently recorded data; wherein the generic layers comprises long-short term memory (LSTM) layers connected to shared fully connected (FC) layers.

6. The non-transitory computer readable medium of claim 5, the instructions further comprising executing a back propagation process on the predictive maintenance models to train the predictive maintenance models together.

7. The non-transitory computer readable medium of claim 5, wherein the associated data is output from execution of the generic layers.

8. The non-transitory computer readable medium of claim 5, wherein the plurality of predictive maintenance models comprise two or more of: remaining useful life (RUL), failure prediction (FP), fault detection (FD), performance degradation (PD).

9. A system for multi task learning with incomplete labels for predictive maintenance, the system comprising:
   one or more components; and
   an apparatus configured to receive the data from the one or more components, the apparatus comprising:
   a processor, configured to, for the data having incomplete labeling to generate a plurality of predictive maintenance models:
   process the data through the multi-task learning (MTL) architecture comprising a neural network with generic layers and task specific layers for the plurality of predictive maintenance models configured to conduct tasks to determine outcomes for the one or more components associated with the data, each task specific layer corresponding to one of the plurality of predictive maintenance models; wherein the generic layers are configured to provide, to the task specific layers, associated data to construct each of the plurality of predictive maintenance models; and execute the predictive maintenance models on subsequently recorded data from the one or more components; wherein the generic layers comprises long-short term memory (LSTM) layers connected to shared fully connected (FC) layers.

10. The system of claim 9, the processor further configured to execute a back propagation process on the predictive maintenance models to train the predictive maintenance models together.

11. The system of claim 9, wherein the associated data is output from execution of the generic layers.

12. The system of claim 9, wherein the plurality of predictive maintenance models comprise two or more of: remaining useful life (RUL), failure prediction (FP), fault detection (FD), performance degradation (PD).

* * * * *